July 17, 1956  J. CZETLI ET AL  2,754,903
DRAPE-SUPPORTING DEVICE
Filed Sept. 18, 1952  3 Sheets-Sheet 2
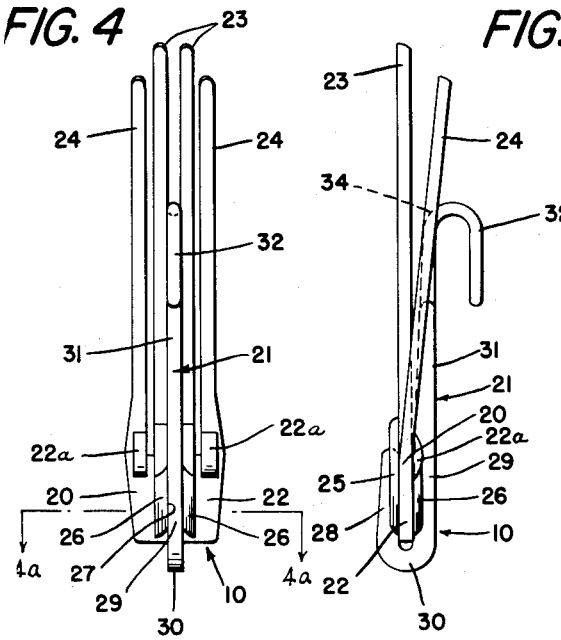
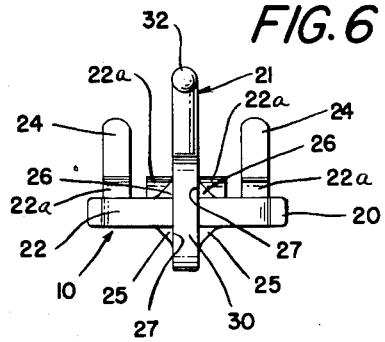
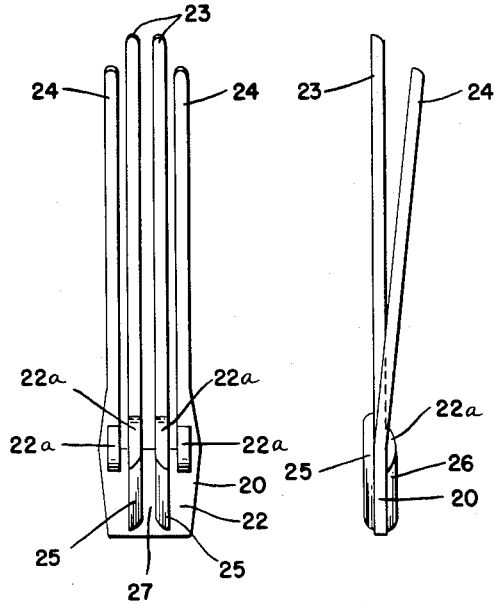
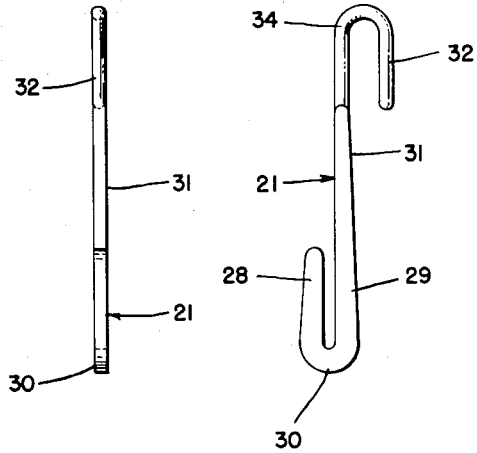
INVENTORS
JESS CZETLI &
RUTH T. LEACH
BY William Cleland
ATTORNEY

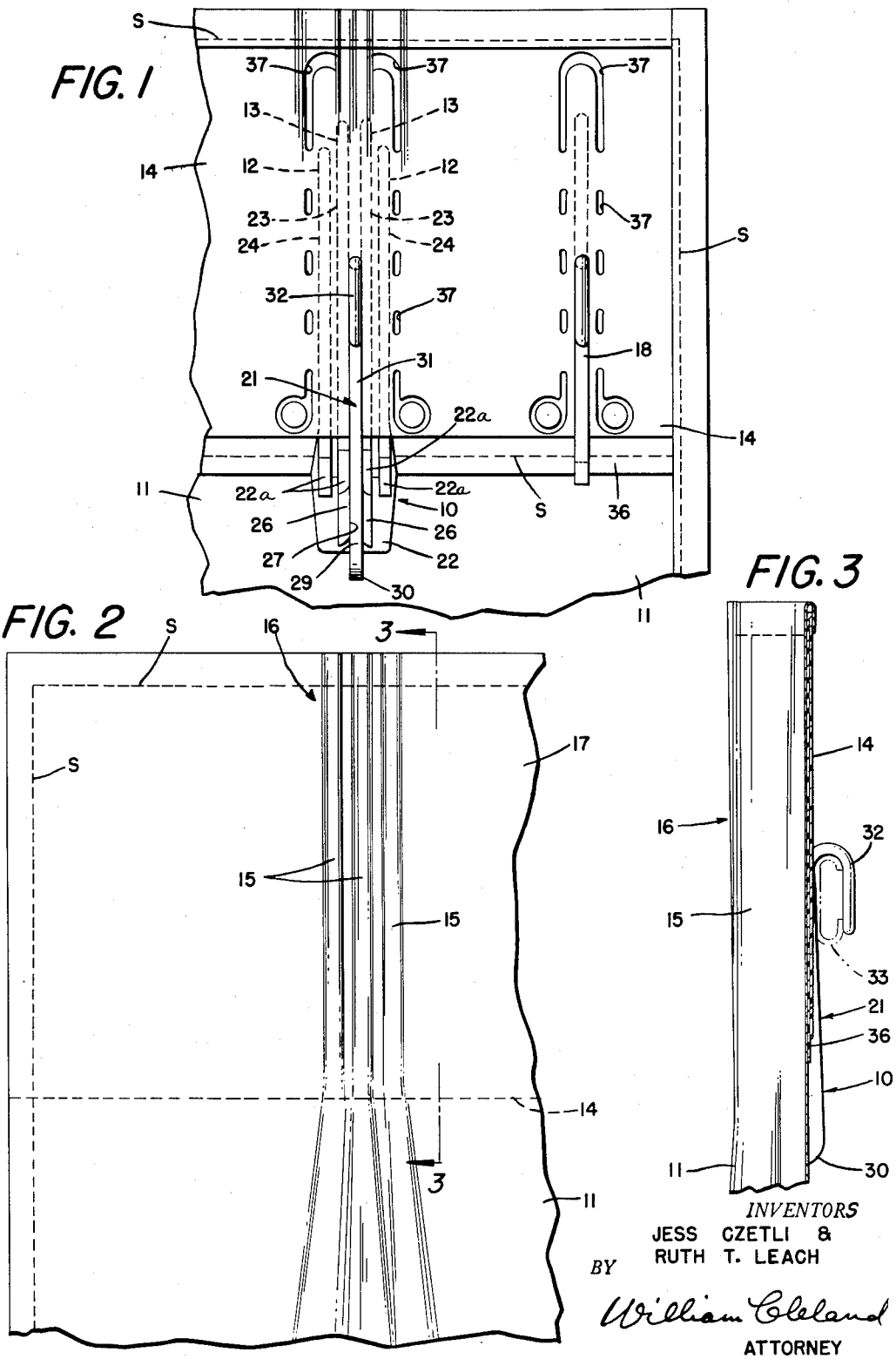

INVENTORS
JESS CZETLI &
RUTH T. LEACH

ATTORNEY

United States Patent Office 2,754,903
Patented July 17, 1956

2,754,903
DRAPE-SUPPORTING DEVICE

Jess Czetli, Copley, and Ruth T. Leach, Cleveland, Ohio, assignors to Plastic Film Products Corporation, Akron, Ohio, a corporation of Ohio Application September 18, 1952, Serial No. 310,312

9 Claims. (Cl. 160—348)

This invention relates to a drape-supporting device of pronged type which holds a drape header in a pucker, and to a header band attachable to the drape for attachment of a plurality of such supporting devices.

Pronged drape-supporting devices heretofore provided have been objectionable because the weight of the drape tended to tilt the puckered portions forwardly at a substantial angle to the vertical. Moreover, such pronged devices could not be substantially modified to overcome this defect due to certain structural limitations incident to manufacturing methods and materials used.

One object of the invention is to provide a pronged drape-supporting device wherein the prongs are so arranged with respect to a rod-engaging hook part on the same that the drape is supported by the device in the form of a uniformly pleated pucker which is substantially straight and vertical.

Another object of the invention is to provide a drape-supporting device of the character described which has a series of prongs in transversely divergent planes and an outstanding supporting hook, and yet which is adapted to be economically manufactured by plastic molding methods.

Still another object of the invention is to provide a plastic band which is readily attachable to drapes and having spaced pockets for receiving the prongs of the improved supporting devices, said band being adapted to be economically manufactured in continuous lengths.

These and other objects of the invention will be manifest from the following brief description and the accompanying drawings.

On the accompanying drawings:

Figure 1 is a fragmentary rear view of the header portion of a drape incorporating the improved header band and a supporting device attached thereto form a pucker.

Figure 2 is a fragmentary front view of the drape showing the puckering effect.

Figure 3 is a vertical cross-section taken on the line 3—3 of Figure 2, illustrating the straight vertical condition of the pucker resulting from use of the improved supporting device.

Figure 4 is rear elevation of a composite supporting device or pin embodying the features of the invention.

Figure 4a is an enlarged cross-section, taken on the line 4a—4a of Figure 4.

Figure 5 is a side elevation of Figure 4, as viewed from the left thereof.

Figure 6 is an enlarged bottom edge view of the device as shown in Figure 4.

Figure 7 is a front elevation of one part of the composite device shown in Figures 4, 5 and 6, that is with the hook part thereof removed from the pronged part.

Figure 8 is a side elevation of the pronged part shown in Figure 7, as viewed from the right of the same.

Figure 9 is a front elevation or edge view of the removable hook part of the device shown in Figures 4, 5, and 6.

Figure 10 is a side elevation of said hook part, as viewed from the right of Figure 9.

Figure 11:
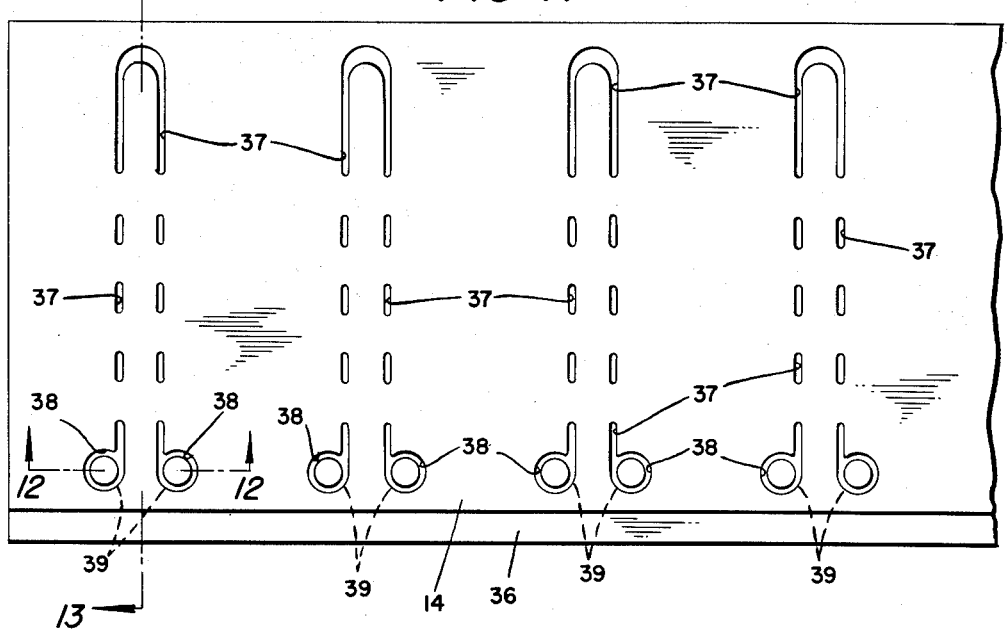
Figure 11 is a fragmentary enlarged rear view of a header band as shown in Figure 1, but in flatwise condition and removed from the drape.
Figure 12:
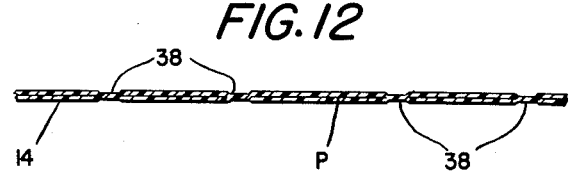
Figure 13:
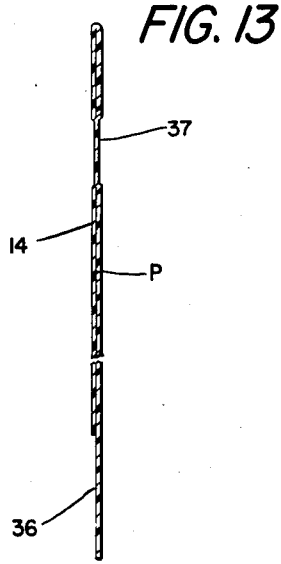

Figures 12 and 13 are cross-sections taken substantially on the lines 12—12 and 13—13, respectively of Figure 11, and on the same scale.

Referring particularly to Figures 1 to 3 there is illustrated a drape-supporting device 10, as shown in Figures 4 to 6, attached to the upper end of a drape 11, by means of laterally spaced prongs 12, 12 and 13, 13 received in separate pockets in a header band 14 sewed to the upper end of the drape, the prongs thereby holding the upper end of the drape puckered in a series of straight, vertical pleats 15, 15. A series of such puckers 16 may be arranged in suitably spaced relation along the header 17 of the drape to attain the effect of a hand-sewed puckered header. If desired single-pronged supporting elements 18 may be provided at the ends of the header.

Referring now to Figures 4 to 6, the supporting device or pin 10 may comprise a composite of two releasably attached parts, namely a pronged part 20 (see also Figures 7 and 8) and a hook part 21 (see also Figures 9 and 10). Pronged part 20 includes a relatively, thin flat base 22 from an upper edge of which relatively narrow prongs extend upwardly in laterally closely spaced relation, four such prongs being shown. A pair of inner prongs 23, 23 extend vertically in the same general plane as base 22, while the two outermost prongs 24, 24 extend upwardly in a plane at an upwardly and rearwardly divergent angle thereto (see Figures 5 and 8). To facilitate insertion of the prongs in the spaced pockets of band 14 the inner prongs 23 are somewhat longer than outer prongs 24. The joints between the base 22 and prongs 23 and 24 may be reinforced by integral arcuate ribs 22a.

The base 22 also has spaced ribs 25, 25 and 26, 26 on opposite sides thereof defining guide groove portions 27 adapted to be frictionally gripped or embraced between inwardly opposed narrow edge portions 28 and 29 of a hooked lower end 30 of hook part 21 to have an elongated upward extension 31 at the rear of the device, said upward extension terminating midway of the length of the prongs in a reversely bent hook 32 adapted to be engaged over a flat curtain rod 33 (see chain-dotted lines in Figure 3).

As best shown in Figure 5, the inner edge of a curved end portion 34 of hook 32 lies within or closely adjacent the plane of the inner prongs 24, whereby when device 10 is in supporting position on rod 33 the center of gravity of the device under load of the drape 11 will be so located that the pucker 16 will be substantially straight and vertical.

Thus, the pronged and hooked parts 20 and 21 may be separately molded of relatively hard plastic, such as synthetic resin, whereas molding of the novel shape of the complete device in one piece would not be possible or practical. In other words, the composite article besides having definite advantages in use, as will be described, lends itself to economical manufacture by known plastic molding processes.

Figures 11 to 13 show an improved form of header band adapted to be sewed or otherwise attached to a drape as illustrated in Figures 1 to 3. Band 14 may be made of a continuous strip of thin, flexible heat fusible vinyl plastic film, folded upon itself so that one side edge extends beyond another at 36. The folded band is run through die members of a high frequency welding machine (not shown) to provide a series of laterally spaced, pocket-forming configurations 37 by fusion of the layers of the band together. These configurations are shown as being generally in the shape of an inverted U, defined by discontinuous welded stitching lines, the open ends of the resultant pockets P being at the opening side of the folded plastic strip. The opening ends of the welded stitching lines may terminate in circular stitched portions 38 to provide outwardly divergent arcuate portions 39, 39 which serve as guides for easy reception of the prongs 23 and 24 of supporting device 10 within the pockets, as well as reinforcing the bonds between the layers at the opening edge of the band 14.

As seen in Figure 1, a length of the high frequency welded band 14 may be thread-stitched or otherwise attached at S to the upper rear or outer face of the drape 11, as best shown in Figure 1, to have the opening ends of the pockets P formed by U-shaped bonding 37 presented downwardly, the single-layer extension 36 providing a guide for insertion of the prongs of the supporting devices 10. In a standard forty inch wide drape there may be approximately twenty-five such pockets in band 14.

In said standard drape four or five supporting devices 10 may be utilized in uniformly spaced apart relation. Each device 10 is attached to the drape as by first partially inserting the two longer prongs 23 in two adjacent pockets P and gathering the drape header in a manner which permits insertion of the two shorter prongs 24 in the two pockets outwardly adjacent the first two, after which the device 10 may be inserted to full depth within the respective pockets, as shown in Figure 1. The four-pronged devices 10 so applied will maintain the header with a series laterally spaced puckers 16 each having three pleats 15, whereby upon the drape being supported on a flat rod 33 by means of hooks 32 of said devices the header 14 will be maintained with the pleats 15 of the puckers in substantially straight vertical relation, as shown in Figures 2 and 3.

Modifications of the invention may be resorted to without departing from the spirit thereof or the scope of the appended claims.

What is claimed is:

1. A drapery-supporting device, comprising a base having a plurality of prongs extending upwardly therefrom in laterally spaced relation, said base having centrally disposed vertical guide portions and a member attached to said base, said member having a hook-part bent reversely of the upward direction of said prongs, said member having a hook-part facing upwardly and frictionally embracing said guide portions to attach the member to said base.

2. A drapery-supporting device, comprising a base having a plurality of prongs extending upwardly therefrom in laterally spaced relation, and a member attached to said base, said member having a hook-part at the rear thereof bent reversely of the upward direction of said prongs, said plurality of prongs including at least one central prong and prongs at laterally opposite sides the same extending at a rearwardly divergent angle thereto.

3. A drapery-supporting device, comprising a base having a plurality of prongs extending upwardly therefrom in laterally spaced relation, and a member attached to said base, said member having a hook-part at the rear thereof bent reversely of the upward direction of said prongs, said plurality of prongs including at least one central prong extending upwardly substantially in a vertical plane and prongs at laterally opposite sides of the same substantially in a plane at a rearwardly divergent angle to said vertical plane.

4. A drapery-supporting device, comprising a base having a plurality of prongs extending upwardly therefrom in laterally spaced relation, and a member attached to said base, said member having a hook-part bent reversely of the upward direction of said prongs, said plurality of prongs including at least one central prong extending upwardly substantially in a vertical plane and prongs at laterally opposite sides of the same substantially in a plane at a rearwardly divergent angle to said vertical plane, the upper end of said hook-part being rounded and the forward edge of the rounded end being substantially in the plane of said rearwardly divergent prongs.

5. A drapery-supporting device, comprising a base having a plurality of prongs extending upwardly therefrom in laterally spaced relation, and a member attached to said base, said member having a hook-part bent reversely of the direction of said prongs, said base having vertical guide portions at transversely opposite sides thereof and said member having a hook-part facing upwardly and frictionally engageable within said guide portions to attach the member on the base.

6. A drapery-supporting device, comprising a base having a plurality of prongs extending upwardly therefrom in laterally spaced relation, and a member attached to said base, said member having a hook-part bent reversely of the direction of said prongs, said plurality of prongs including at least one central prong extending upwardly substantially in a vertical plane and prongs at laterally opposite sides of the same substantially in a plane at a rearwardly divergent angle to said vertical plane, said base having vertical guide portions at transversely opposite sides thereof and said member having a hook-part facing upwardly and frictionally engageable within said guide portions to attach the member on the base.

7. The combination of a plurality of drapery-supporting devices having a plurality of spaced prongs, and a drape to be supported thereby, with a header band on the upper end of the drape to extend laterally thereof, said band comprising a double layer of fusible plastic sheet material, said layers in a flatwise superposed relation being attached by laterally closely spaced, vertically extending fused portions defining a series of relatively narrow laterally spaced pockets a plurality of which are each adapted to receive a prong of a said device, the lower ends of said vertically extending fused portions of the respective pockets terminating in laterally outwardly divergent arcuate portions of substantial width engageable by said prong for facilitating insertion of the same in the respective pockets, whereby the prongs in the spaced pockets will hold the header band in puckered relation.

8. A header band for drapes comprising a flexible sheet of fusible plastic sheet material folded downwardly upon itself to provide flatwise superposed layers and a bottom opening portion, said flatwise superposed layers being attached by laterally closely spaced, vertically extending fused portions defining a series of laterally spaced pockets opening at said bottom opening portion, the opening ends of said vertically extending portions of the respective pockets terminating in outwardly divergent arcuate portions of substantial width engageable by said prong for facilitating insertion of spaced prongs of a drapery-supporting device into said pockets, whereby the prongs in the spaced pockets will hold the header band in puckered relation.

9. A header band for drapes comprising a sheet of fusible plastic sheet material folded downwardly upon itself to provide flatwise superposed layers and a bottom opening portion, said flatwise superposed layers being attached by laterally closely spaced, vertically extending fused portions defining a series of laterally spaced pockets opening at said bottom opening portion, the opening ends of said vertically extending fused portions of the respective pockets terminating in circular fused portions of the layers defining outwardly divergent arcuate portions for facilitating insertion of spaced prongs of a drapery-supporting device, whereby the prongs in the spaced pockets will hold the header band in puckered relation.

References Cited in the file of this patent

UNITED STATES PATENTS

| | | |
|---|---|---|
| 2,012,734 | Steiner | Aug. 27, 1935 |
| 2,522,358 | Franson | Sept. 12, 1950 |
| 2,558,467 | Solomon | June 26, 1951 |
| 2,658,551 | Bender | Nov. 10, 1953 |
| 2,666,472 | Hosfield | Jan. 19, 1954 |

FOREIGN PATENTS

| | | |
|---|---|---|
| 474,716 | Canada | June 26, 1951 |